INVENTOR
P. C. MICHAELIS
BY Herbert M. Shapiro
ATTORNEY

MAGNETIC DOMAIN PROPAGATION DEVICE

Filed Sept. 16, 1966 Sheet 2 of 4

July 8, 1969 P. C. MICHAELIS 3,454,939

MAGNETIC DOMAIN PROPAGATION DEVICE

Filed Sept. 16, 1966 Sheet 3 of 4

United States Patent Office 3,454,939

Patented July 8, 1969

3,454,939

MAGNETIC DOMAIN PROPAGATION DEVICE

Paul C. Michaelis, Scotch Plains, N.J., assignor to Bell Telephone Laboratories, Incorporated, Murray Hill and Berkeley Heights, N.J., a corporation of New York Filed Sept. 16, 1966, Ser. No. 579,995
Int. Cl. G11c *11/14, 19/50*
U.S. Cl. 340—174 18 Claims

ABSTRACT OF THE DISCLOSURE

A multidimensional shift register is achieved in a single film of anisotropic magnetic material by means of the controlled movement of a self-bounded reverse-magnetized domain in the plane of the film. Such a domain is free to move along either the hard or easy axis of the film in the absence of uncontrolled expansion along the nonselected axis.

Shift registers, conceptually devices which operate to transfer information along a single axis or dimension of a propagation medium, are herein extended to two-dimensional operation.

Shift registers are common elements in data processing systems. Such elements are known to provide an instrumentality through which information may be moved controllably along an axis toward an output position where the information may be detected. K. D. Broadbent Patent No. 2,919,432, issued Dec. 29, 1959, discloses one such element.

Although shift registers are common currency in data processing systems, their use is limited because of the inability to take plural (viz parallel) outputs from such elements without considerable expense. Consequently, the shift register is relegated primarily to series (or parallel) in-series out operations whenever practical, a relatively limited horizon.

Applicant has discovered a shift register implementation which permits a flexibility not realized heretofore in shift register operation, a shift register operable on a two-dimensional basis. The advantages of such an arrangement are manifest. Specifically, multiple shift register channels are defined simply on a magnetic sheet by equally simple printed circuit techniques. Moreover, information is moved serially through a channel, serially from channel to channel, in parallel through all or prescribed ones of the channels, and in parallel from channel to channel. The advantages, however, will become clearer hereinafter. The operation of a shift register on a two-dimensional basis will be seen not only to permit a host of new functions to be performed but also to enable the performance of functions hitherto thought too expensive for a shift register implementation.

Let us return to a simple prior art shift register as a point of departure. Patent No. 2,919,432 has already been mentioned. That patent describes what is commonly known as a domain wall shift register. Typically, a domain wall shift register comprises a thin anisotropic magnetic film, such as a permalloy film, in an input position of which "reverse (magnetized) domains" are formed for subsequent movement to a remote output position for detection. The film is usually initialized to a first magnetization direction and the reverse domain is defined in a portion of the film in which the magnetization is reversed to a second direction. The films are anisotropic and propagation is along either the hard or the easy axis of the film. Whichever the direction of propagation, the leading and trailing domain walls bounding the reverse domain are artificially bounded by the edge of the film. This artificial bounding of the film is important because as the domain walls are bounded by the edge of the film in one dimension so is the shift register constrained to operation along a single axis oriented along the other dimension.

It is also known that a reverse domain may be bounded by a single domain wall. Such a domain differs from the domain propagated in the aforementioned Broadbent patent specifically in that the single domain wall encompassing the former has a geometry independent of (viz, unconstrained by) the host film geometry. Applicant has discovered that such single wall domains can be formed controllably and propagated along both hard and easy axes in an anisotropic film enabling the two-dimensional operation referred to earlier. More specifically, the invention is based on the discovery that a single wall domain may be provided in an anisotropic thin magnetic film and moved controllably in a direction along the hard axis thereof in shift register type operation. The invention is further based on the realization that such controlled movement of single wall domains in a direction along the hard axis is completely compatible with the provision of step-along propagation fields effecting movement of reverse domains in a direction along the easy axis. A single wall domain may be defined as a reverse magnetized domain bounded by a single domain wall having a shape independent of the boundaries of (viz, unconstrained) the host film and substantially unchanging with reduction in size.

Accordingly, an object of this invention is to provide a new and novel information propagation arrangement.

The foregoing and further objects of this invention are realized in one embodiment thereof wherein a single wall domain is nucleated in an input position of a thin anisotropic film. A plurality of spaced hairpin-shaped conductors, each oriented in a direction along the hard axis of the film are provided to controllably generate easy direction propagation fields when pulsed. In addition, a plurality of solenoids oriented in the direction of the easy axis are provided to controllably generate hard direction enabling fields. And, finally, a plurality of multiphase propagation straps each oriented in the direction of the hard axis are provided. A single wall domain is propagated controllably along the hard axis by bipolar pulses on a selected hairpin conductor where propagation is enabled by a hard direction field generated about a selected solenoid. A single wall domain is propagated in the direction of the easy axis by multiphase pulsing of selected propagation straps.

A feature of this invention is an information propagation arrangement comprising a thin anisotropic magnetic film, means providing a single wall domain at an input position in the film, and means moving single wall domains in orthogonal directions in said film.

Another feature of this invention is an information propagation arrangement comprising a thin anisotropic magnetic film, means providing a single wall domain at an input position in the film, and means moving the domain along the hard axis of the film.

The foregoing and further objects and features of this invention will be understood more fully from a consideration of the following detailed description rendered in conjunction with the accompanying drawing, wherein.

Figures 1, 2, 3:
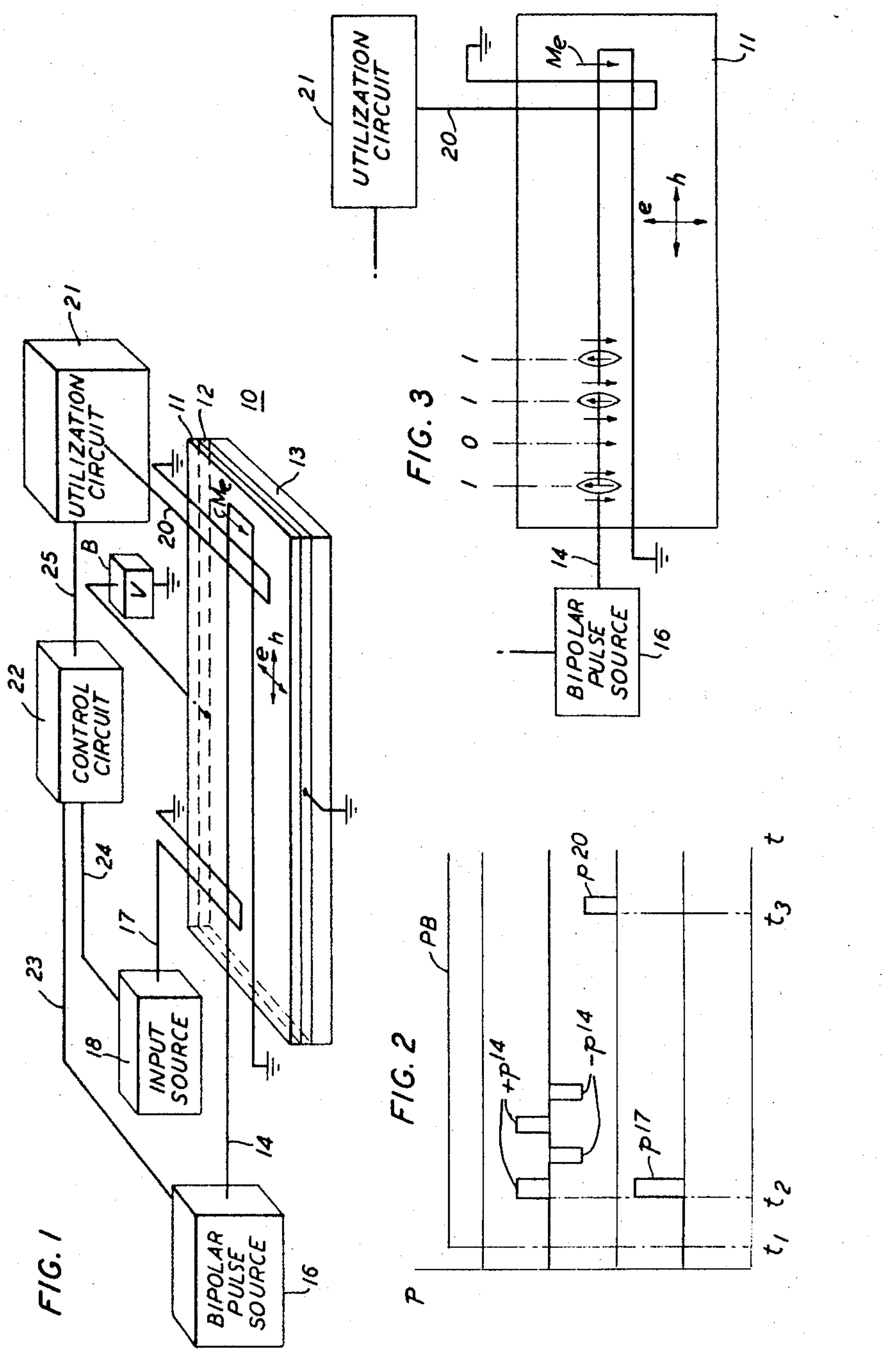
FIG. 1 is a schematic representation of a shift register channel in accordance with one aspect of this invention.
FIG. 2 is a pulse diagram of the operation of the shift register channel of FIG. 1.
FIGS. 3 through 6 are schematic representations of a portion of the shift register channel of FIG. 1 showing the magnetic condition thereof during operation.

Specifically, FIG. 1 shows a shift register channel 10 in accordance with one aspect of this invention. The channel 10 comprises an electrically nonconducting magnetic film 11 and an electrically conducting film 12 deposited on a suitable insulating substrate 13 such as glass. Conducting film 12, which may be copper, conveniently, is connected between a voltage source B, such as a battery, and ground in a manner to provide parallel current lines therethrough. A hairpin conductor 14 overlies film 11 and is connected between a bipolar pulse source 16 and ground. Conductor 14 is oriented in a direction along the hard axis thus providing easy direction fields thereabout when pulsed. Conducting film 12 is connected, as is clear from the figure, in a manner to provide a hard direction field in film 11. The hard and easy axes of film 11 are indicated by the double-headed arrows designated *h* and *e*, respectively.

A nucleation conductor 17 couples film 11 at an input position illustratively also coupled by conductor 14. Conductor 17 is connected between an input pulse source 18 and ground. A sense conductor 20 couples film 11 at an output position also coupled by conductor 14. Conductor 20 is connected between utilization circuit 21 and ground.

Sources 16 and 18 and utilization circuit 21 are connected to a control circuit 22 via conductors 23, 24, and 25, respectively. The various sources and circuits may be any such elements capable of operating in accordance with this invention.

The operation of the shift register channel 10 of FIG. 1 is simple as is clear from a glance at the pulse diagram of that operation shown in FIG. 2. Specifically, the current flowing on conducting film 12 of FIG. 1 generates a bias field directed along the hard axis from the input to the output position in magnetic film 11. This is shown in FIG. 2 by pulse PB initiated at a time *t1*. At a time *t2* in FIG. 2, a pulse P17 is provided in conductor 17 via input source 18 under the control of control circuit 22. Bipolar pulse(s) +P14 (and −P14 alternating) is (are) initiated concurrently in conductor 14, via bipolar pulse source 16, also under the control of control circuit 22. In response, a single wall domain is nucleated at the input position and propagated, incrementally, toward the output position. At a later time *t3*, determined by the frequency and amplitude of the bipolar pulses on conductor 14 and by the hard direction bias field as discussed in greater detail hereinafter, an output pulse P20 is induced in sense conductor 20, as the domain passes therebeneath, for detection via utilization circuit 21 under the control of control circuit 22. Conveniently, an erasing bias field $M_e$ is provided in film 11 to erase single wall domains once sensed. Such a bias is provided by well known means not shown.

The presence and absence of a pulse in conductor 17 determines whether or not a single wall domain is nucleated in the input position. Thus, the presence and absence of such a domain may be taken to represent a binary one and a binary zero, respectively. An input conveniently corresponds, in time, to a positive pulse of the bipolar propagation pulse sequence applied to conductor 14. The pulse on conductor 17 may even be reduced in amplitude such that the presence of a positive pulse on conductor 14 is necessary for nucleation. Be that as it may, adjacent bit positions in film 11 are spaced apart at least the distance a single wall domain moves in one alternation of the pulses applied to conductor 14. A representative stored code 1101, then, appears as shown in FIG. 3 reading from right to left. The magnetization of the film is assumed initialized to a direction along the easy axis represented by a downward directed arrow as viewed. The single wall domain then is represented by an oval including an upward directed arrow. The coded word provides pulse, pulse, null, and pulse in consecutive time slots as consecutive bits pass conductor 20, for detection by utilization circuit 21.

The mechanism for moving a single wall domain in a direction along a hard axis of an anisotropic thin film in accordance with this invention is not completely understood. The observed operation, however, is accounted for in connection with FIGS. 4, 5 and 6.

Figure 4:
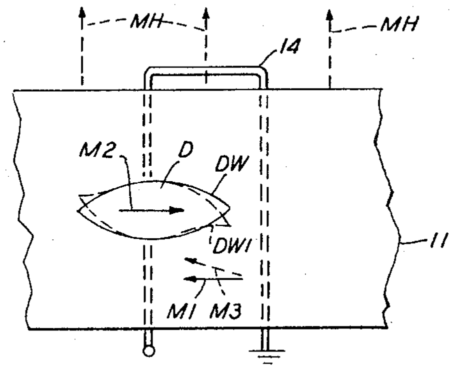

FIG. 4 shows (magnified) a single wall domain D at an input position in a film such as film 11 of FIG. 1. The film as shown in FIG. 4 may be thought of as film 11 viewed from beneath the film as shown in FIG. 1. The conductor corresponding to conductor 14 of FIG. 1 then would be shown partially hidden by the film. The magnetization of the film is in a first easy direction as indicated by the arrow M1 directed to the left in the figure and is seen to be opposite to the magnetization of the domain D which is in a second easy direction as indicated by the arrow M2 directed to the right. The domain D is shown bounded by the single domain wall represented by closed-curve line DW.

A hard direction (bias) field is indicated by the broken arrows MH directed upward as viewed in the figure. The hard direction field raises the left tip of the domain D and lowers the right tip of the domain as viewed in the figure. To this end, it is clear that the hard direction field (MH) and first easy direction field (M1) of the film are superposed to provide a field indicated by the broken arrow M3 directed upward and to the left in the figure. The field indicated by arrow M3 is operative on the left and right tips of domain D urging the latter into a shape aligned with the field. Thus, in the presence of the hard direction field, domain D assumes the geometry indicated by broken closed-curve line DW1 which represents the position of the bounding domain wall when a hard direction field is present. This is the condition at time *t2* of FIG. 2.

Next, a positive pulse (+P14) is applied to conductor 14 providing a field directed to the left in film 11 in the position occupied by domain D. The domain D is in a position bounded by broken lien DW1 of FIG. 4 shown solid in FIG. 5. The easy direction field now applied in the position of domain D superposes with the hard direction fields and with the first and second easy direction fields outside and inside the domain D respectively. The resolved fields outside the domain D are indicated by the arrow M4 directed upward and to the left in FIG. 5. The left and right tips of the domains extend and contract, respectively, changing their orientations to align with the field indicated by arrow M4. The resulting position of the domain wall of domain D is indicated by the broken closed-curve line DW2 in FIG. 5.

Figure 6:
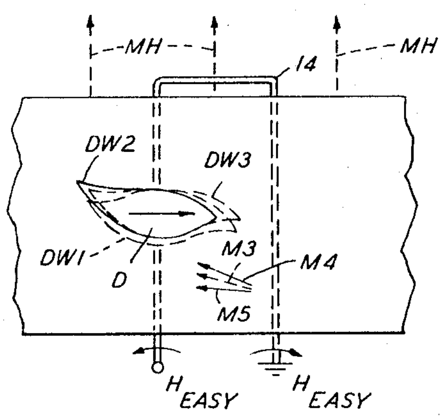

Curve DW2 is shown solid in FIG. 6. A negative pulse (−P14) is applied next to conductor 14 reversing the applied easy direction field in the position occupied by domain D as indicated by the curved arrow to the left on conductor 14. The resolved field now is in a direction indicated by the arrow M5, directed upward and to the left as viewed in FIG. 6, and the domain D again aligns itself with that field as indicated by the broken curve DW3 in FIG. 6.

The three arrows M3, M4, and M5, representing the hard direction and first and second easy direction fields superposed on the film anisotropy field as described, are shown in FIG. 6. It is clear that arrow M3 represents a mean position and arrows M4 and M5 represent extreme positions to which the magnetization is rotated by the fields generated by the bipolar pulses applied to conductor 14. The initial position of the domain D as shown in FIG. 4 under the influence of a hard direction field is shown in FIG. 6 encompassed by broken curve DW1. The domain in its terminal position after a single alternation on conductor 14 is shown encompassed by broken curve DW3. A net upward displacement is represented by the distance between those two curves. That displacement has been observed to be about 2,000 angstrom units for domains having heights (up and down dimension as viewed) of from less than 1.0 mil to 3.5 mils and widths (transverse to the direction of displacement) of less than about 18 mils.

A reversal of the hard direction field provides similar displacement of the domain downward, as viewed, along the hard axis.

Figure 7:
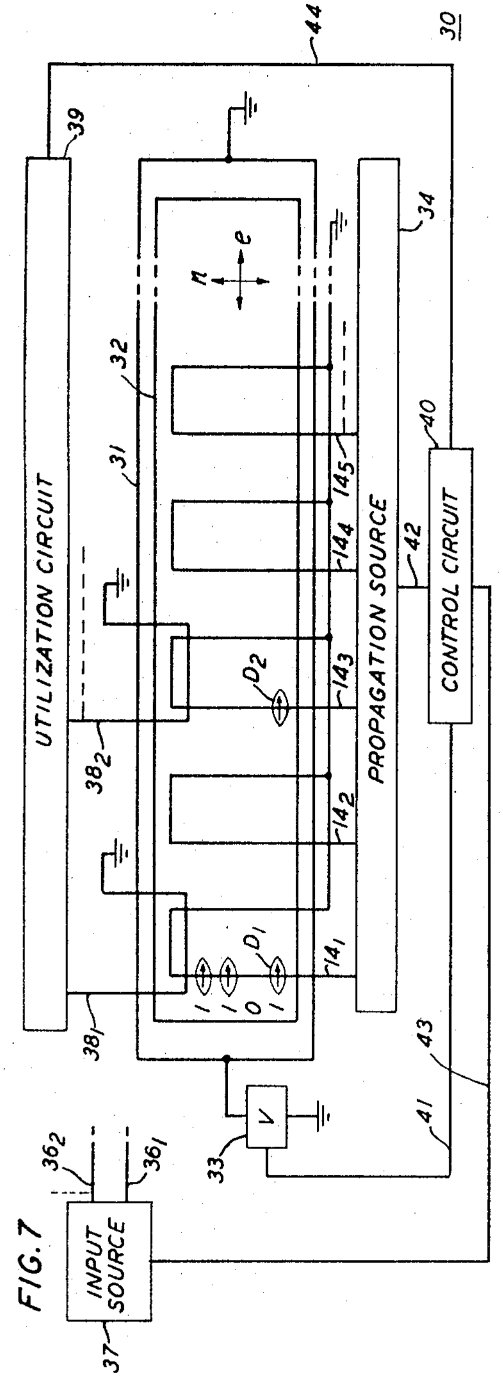
FIGS. 7, 10 and 11 are schematic illustrations of two-dimensional shift registers in accordance with another aspect of this invention.

An understanding of the basic shift register channel in accordance with one aspect of this invention, as shown in FIG. 1, and the operation thereof provide a pedestal for an understanding of more complex arrangements in accordance with other aspects of this invention. For example, FIG. 7 shows a multiple shift register channel arrangement 30 in accordance with another aspect of this invention. The multiple register arrangement 30 comprises a conductive sheet 31 and a thin magnetic film 32 arranged as shown in FIG. 1. Conductive sheet 31 is connected between a voltage source 33 and ground to provide a hard direction enabling field as described in connection with FIG. 1. A plurality of hairpin conductors $\mathbf{14}_1$, . . . $\mathbf{14}_5$ . . . $\mathbf{14}_n$ overlie film 32 and are oriented along the hard axis to provide easy direction fields in film 32 when pulsed. Conductors $\mathbf{14}_1$ . . . and $\mathbf{14}_n$ are connected between a propagation pulse source 34 and ground. Input conductors $\mathbf{36}_1$, $\mathbf{36}_2$ . . . couple film 32 at input positions associated (illustratively) with alternate conductors $\mathbf{14}_1$, $\mathbf{14}_3$ . . . in a manner shown in FIG. 1. Those input positions for conductors $\mathbf{14}_1$ and $\mathbf{14}_3$ are marked by the single wall domains D1 and D2 shown in FIG. 7. Conductors $\mathbf{36}_1$, $\mathbf{36}_2$ . . . are connected between an input source 37 (as indicated) and ground. An output position may be defined with respect to each channel of FIG. 7 as was the case in connection with the register of FIG. 1. Sense conductors $\mathbf{38}_1$, $\mathbf{38}_2$ . . . are shown coupled to such output positions, however, in only two channels, for simplicity, operating to detect the single wall domains (or absence of domains) in the manner already described. Conductors $\mathbf{38}_i$ are connected between a utilization circuit 39 and ground.

The sources 33, 34 and 37, and utilization circuit 39 are connected to a control circuit 40 via conductors 41, 42, 43 and 44, respectively. The various sources and circuits may be any such elements capable of operating in accordance with this invention.

Each of conductors $\mathbf{14}_1$, $\mathbf{14}_3$, and $\mathbf{14}_5$ defines a shift register channel which may be operated independently exactly as described in connection with FIG. 1, propagation source 34 providing the requisite bipolar pulses under the control of control circuit 40. The arrangement of FIG. 7, however, provides an additional flexibility. Specifically, domains stored therein may be moved not only upward and downward serially along the hard axis as already described but also may be moved to the left and to the right as viewed in FIG. 7, in parallel in the direction of the easy axis there.

Figure 8:
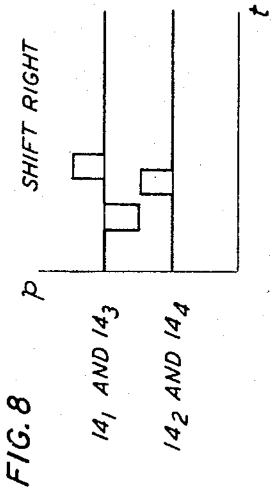
FIGS. 8 and 9 are pulse diagrams of the operation of the two-dimensional shift register of FIG. 7.
Figure 9:
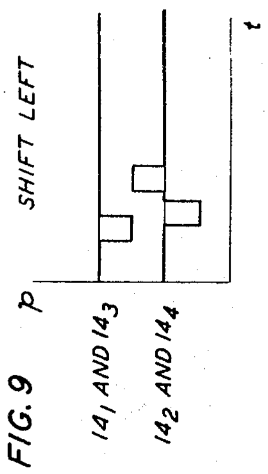

FIGS. 8 and 9 are pulse diagrams of the operation for the parallel shifting of domains (representing information) to the right and to the left respectively as viewed in FIG. 7. In general, to shift to the right all information in film 31 of FIG. 7, a negative pulse is applied to odd numbered conductors $\mathbf{14}_1$, $\mathbf{14}_3$, and $\mathbf{14}_5$ followed by a positive pulse on even numbered conductors $\mathbf{14}_2$, $\mathbf{14}_4$ . . . and by a concurrent positive pulse on odd numbered conductors $\mathbf{14}_1$, $\mathbf{14}_3$, and $\mathbf{14}_5$. Operation for movement to the left and to the right is, illustratively, on a two-phase basis as will become clear and, thus, even numbered hairpin conductors $\mathbf{14}_2$, $\mathbf{14}_4$ . . . do not define entirely independent shift registers in this arrangement although sense conductors may be coupled thereto and outputs derived at each as is described hereinbefore.

To shift information to the right from one shift register channel, to the next adjacent channel a negative pulse (see FIG. 6) is applied to, for example, conductor $\mathbf{14}_1$ followed by concurrent positive pulses (see FIG. 5) on conductors $\mathbf{14}_2$ and (then) $\mathbf{14}_1$. The negative pulse on the hairpin conductor $\mathbf{14}_1$, it is to be noted, is poled oppositely in the return path of the hairpin. Thus, fields are generated by that initial negative pulse to move the domains to the right to positions overlying the return path of hairpin conductor $\mathbf{14}_1$. The concurrent pulses on conductors $\mathbf{14}_2$ and $\mathbf{14}_1$ move the information, similarly, to positions overlying conductor $\mathbf{14}_2$. The positive pulse on conductor $\mathbf{14}_1$ trails that applied to conductor $\mathbf{14}_2$ to insure that the information moves to positions along conductor $\mathbf{14}_2$ rather than returns to the initial positions. Information is now stored in the shift register channel defined by conductor $\mathbf{14}_2$. All shifting pulses are applied by means of propagation source 34 under the control of control circuit 40.

When information, stored serially in one channel, is moved in parallel to another channel as just described, the other channel must be unoccupied to receive the information. When viewed in this light, it is clear that corresponding bit positions in adjacent shift register channels of FIG. 7 also constitute shift register channels operated in parallel. Consider then that information is stored along the channel defined by hairpin conductor $\mathbf{14}_1$ as shown in FIG. 7 and that additional information is stored in the channel defined by hairpin conductor $\mathbf{14}_3$ as represented by the domain D2 there. In this instance information is moved one channel to the right synchronously by applying a negative pulse to conductors $\mathbf{14}_1$ and $\mathbf{14}_3$ followed by concurrent positive pulses on conductor pairs $\mathbf{14}_2$ and $\mathbf{14}_4$, and $\mathbf{14}_1$ and $\mathbf{14}_3$, as shown in FIG. 8. It is to be understood that the fields applied are sufficient to move but not nucleate single wall domains. Accordingly, if a domain is absent in a particular position, the absence of a domain is propagated.

To shift the information back again to the channels defined by hairpin conductors $\mathbf{14}_1$ and $\mathbf{14}_3$, concurrent negative pulses are applied similarly to conductor pairs $\mathbf{14}_1$ and $\mathbf{14}_3$ and (then) to $\mathbf{14}_2$ and $\mathbf{14}_4$, followed by a positive pulse applied to conductor pair $\mathbf{14}_2$ and $\mathbf{14}_4$ as indicated in FIG. 9. It is clear that the conductors $\mathbf{14}_i$ pulsed in pairs for such shifting may, alternatively, be connected in series. The shifting of single wall domains to the right and to the left takes place in a manner consistent with the movement of reverse domains of the prior art along an easy axis as described in the aforementioned Broadbent patent. The hard direction field required herein for movement along a hard axis is not present during movement along an easy axis.

The embodiment of FIG. 7, then, not only permits the readout of separate shift register channels in parallel in a manner consistent with that described in connection with FIG. 1, but also permits information to be stored sequentially in a single channel and moved in parallel to another channel. Accordingly, a plurality of shift register channels are provided in a single magnetic film with the capability of shifting information in parallel therebetween. For example, the parallel shifting of the illustrative word 1011, shown in FIG. 7, from the channel defined by conductor $\mathbf{14}_1$ to that defined by conductor $\mathbf{14}_4$ is accomplished herein merely by the repetition of the pulses shown in FIG. 8.

Figures 10, 11:
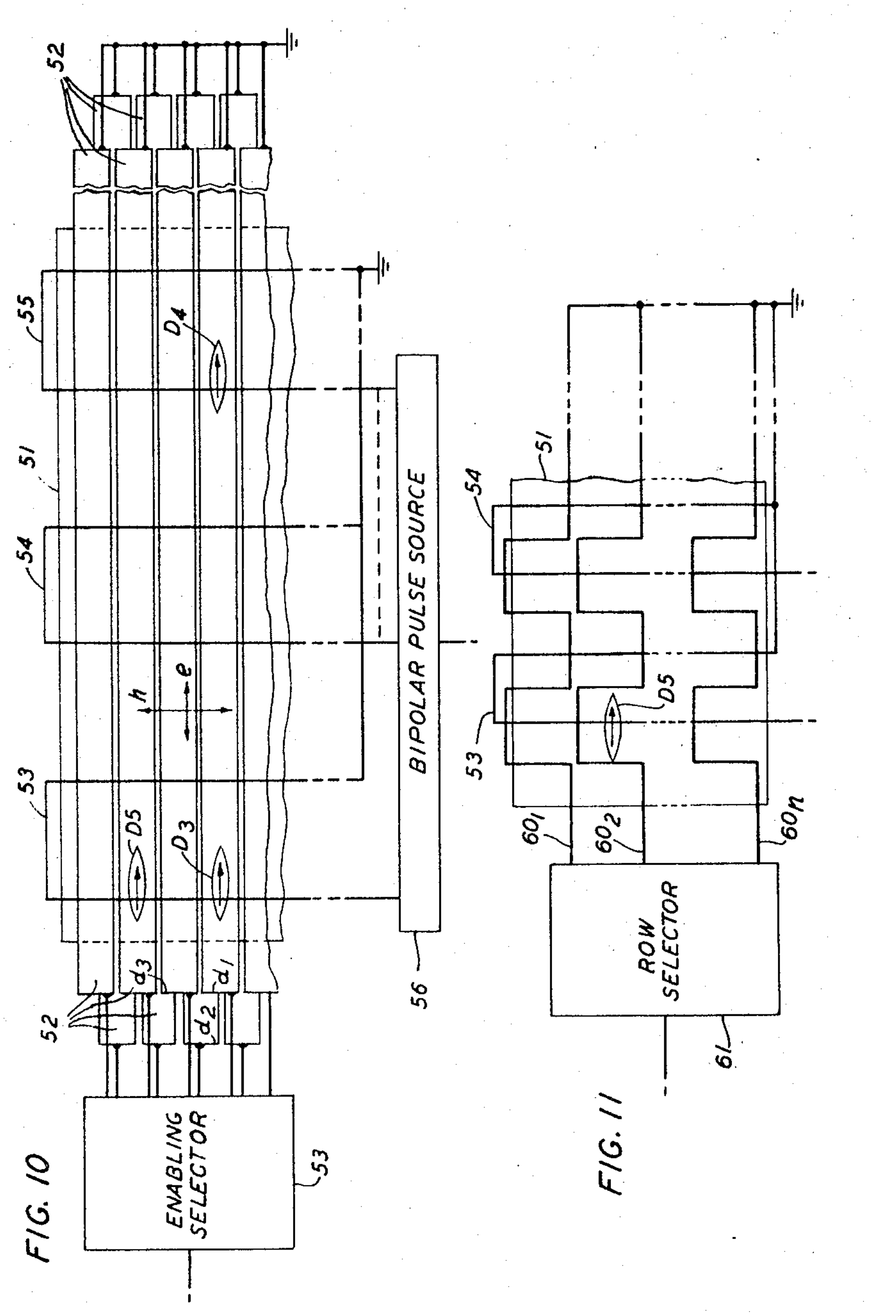

The parallel shifting of information from one channel to another in accordance with an aspect of this invention has been discussed in connection with the embodiment of FIG. 7. FIGS. 10 and 11 show compatible arrangements whereby individual bits (single wall domains and the absence of domains) may be shifted along a shift register channel as shown in FIG. 1 or from one channel to another as shown in FIG. 7.

If a plurality of solenoids were arranged to provide a hard direction field only along horizontal bands or sections of film 31 as viewed in FIG. 7, the shifting of individual bits in a channel is realized. The hard direction field is termed the enabling field herein because, in the absence of such a field, movement in a direction along the hard axis is inhibited. Accordingly, by controllably providing the hard direction fields along horizontal bands of the magnetic film, movement is enabled along the hard axis only through a selected band. If those bands are about twice as wide as a single wall domain and overlapping (by the width of a domain) then we have the capability of moving single wall domains one at a time in the hard direction.

Consider FIG. 10. A thin magnetic film 51 is shown with a plurality of overlying solenoids 52. Solenoids 52 are overlapping as shown and oriented along the easy axis of film 52 between an enabling selector 53 and ground. Such solenoids are provided, conveniently, by printed circuit techniques utilizing, for example, copperclad Mylar. Three hairpin conductors 53, 54, and 55 are shown, illustratively, connected between a bipolar pulse source 56 and ground. Operation is entirely analogous to that described hereinbefore. In the absence of a hard direction field provided by activating a selected solenoid 52, bipolar pulses on a selected hairpin are inhibited from moving a domain along the hard axis. Therefore, single wall domain D3 of FIG. 10 may be moved upward for example, one position as viewed, while domain D5 remains stationary. This is accomplished, specifically, by activating in succession the solenoid 52 overlying domain D3, the next adjacent overlapping solenoid 52 (upward), and then the next adjacent solenoid as bipolar pulses are applied to hairpin conductor 53. These solenoids are designated $d_1$, $d_2$, and $d_3$ respectively. It is clear that domain D5 does not move because no hard direction field is present at its position. It is also clear that domain D4, in the channel defined by hairpin conductor 55, does not move because bipolar pulses are not applied to hairpin conductor 55. The enabling selector 53 and bipolar pulse source 56 are connected to a control circuit (not shown). The various elements may be any such elements capable of operating in accordance with the teachings of this invention.

FIG. 11 shows a plurality of conductors $\mathbf{60}_j$ oriented along the easy axis of film 51 and connected between a row selector 61 and ground. The row conductors follow a crenelated pattern including portions thereof oriented along the hard axes. Those last-mentioned portions are interleaved with corresponding portions of hairpin conductors such at 53 and 54 of FIG. 10. Such conductors (along with the hairpin conductors) operate as propagation straps to generate easy direction step-along fields on a four-phase basis is defined areas of film 51. Such operation is entirely consistent with the four-phase propagation operation disclosed in the aforementioned Broadbent patent particularly as further described in copending application Ser. No. 550,389, filed May 16, 1966, for A. H. Bobeck and J. L. Smith. To this end, the hairpin conductors are connected to a propagation source (not shown) as well as to a bipolar pulse source shown in FIG. 10 which may include bipolar pulse source 56 for effecting hard direction translation. If the hairpin conductors are connected in series, information is moved synchronously through a selected horizontal channel. If, alternatively, the hairpin conductors are arranged to be pulsed separately, asynchrous operation is enabled.

Figure 5:
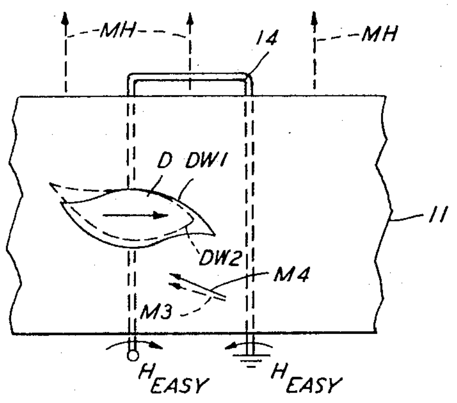

The movement of a single wall domain along the hard axis of a film in accordance with this invention requires bipolar easy direction fields as has been described hereinbefore. Each alternation of the easy direction field advances the domain as shown in FIGS. 4 through 6. Each domain so advanced is clear of an input position before a next adjacent bit is stored. The number of alternations required in this connection, then, depends on the dimension of the domain being moved along the hard axis. For domains having a dimension of about 0.33 mil along the hard axis, a number of alternations are necessary, adjacent bits being spaced one domain apart. Bit spacings are maintained, illustratively, while domains are being moved between input and output positions herein.

The speed at which domains are moved along the hard axis of a film in accordance with this invention depends on the amplitude and frequency of the bipolar pulses applied to the hairpin conductors herein. Specifically, an increase in the frequency of the bipolar pulses increases the rate at which a domain goes through the cycle depicted in FIGS. 4 through 6. If a single alternation causes an advance of 2,000 angstrom units, then the number of alternations per second determines the ultimate displacement. Frequencies of from two cycles per second to 200 megacycles provide displacement per second of from 4,000 angstrom units to $2\times10^{11}$ angstrom units or over one meter per second. The amplitudes of the bipolar pulses are important because those amplitudes determine the extreme orientations of the fields represented by arrows M4 and M5 in FIG. 6 and thus determine the extent of the movement of the domain tips as shown in FIGS. 4 through 6. It is clear that large pulses run the risk of countering the initial easy direction magnetization along the axis of the hairpin driving the film uniformly to the hard direction therealong erasing domains and nucleating other spurious domains. But pulses below such a level cause increased tip movement and thus lead to increased displacement per alternation. Pulse ranging from the wall motion threshold of the material to the nucleation threshold (threshold for nucleating new domains) cause displacement per cycle of from about 2,000 angstrom units to a domain width per alternation.

The amplitude of the hard direction field is also of importance in determining the rate of displacement of domains along a hard axis of a magnetic film in accordance with this invention. For a given material, the orientation of the mean field indicated by arrow M3 of FIG. 6 is determined by the amplitude of the hard direction field. The larger the field, the more nearly the arrow M3 is aligned along the hard direction. This leads to a greater movement of the domain tips and, thus, to a greater domain displacement per alternation. Hard direction fields of from zero to the nucleation threshold provide displacements ranging from zero to a domain width per alternation.

The coercive force of the material also plays a part in determining the rate of displacement of domains in accordance with this invention. For example, in magnetic films in which the field threshold for nucleating domains exceeds the wall motion threshold for moving the wall of those domains by a factor of about twelve, the drive currents for providing the bipolar pulses also may vary by a factor of twelve. It is clear then that the amplitude of the bipolar pulses depends on the coercive force of the material.

The advantages of the arrangements in accordance with this invention are made clearer from a recitation of the dimensions involved. Domains of 1 x 18 mils have been observed by the Kerr (optic) effect. Accordingly, hairpin conductors arranged on 15 mil centers permit an array of $500\times35$ bit locations per square inch of film. A considerable reduction in domain size is observed as higher coercive force materials are employed. Such a reduction, of course, permits a large increase in packing density and packing densities on the order of about $1000\times100$ are anticipated with increasingly higher coercive force material. Similarly, the thinner the film the smaller the possible domain size as is known in the art to be true of conventional reverse domains. Consequently, by simple printed circuitry techniques high density multiple shift register channels are provided in a single magnetic thin film and information may be moved with considerable freedom within a channel or from channel to channel in a simple manner. It is clear that the movement of stored information in accordance with this invention is responsive to a pulse grogram and that great latitude in that program is possible.

In addition to the series or parallel movement of bits in orthogonal directions in a film, adjacent words or bits in a single word may be separated thus permitting the sorting of information. Also, bits of different words may be interchanged controllably thus permitting coding.

What has been described is considered only illustrative of the principles of this invention. Accordingly, various and numerous other arrangements may be devised by one skilled in the art without departing from the spirit and scope of this invention.

What is claimed is:

1. A combination comprising an anisotropic thin magnetic film having hard and easy axes, means for providing in said film a single wall domain having a boundary unconstrained by the boundary of the plane of said film and being free to move along either said hard or easy axis, and means for moving said domain selectively along said hard axis in a manner such that said domain does not expand uncontrollably along said easy axis.

2. A combination in accordance with claim 1 wherein said first means comprises means for providing a field directed along said hard axis, and means oriented along said hard axis for providing bipolar fields directed along said easy axis.

3. A combination in accordance with claim 2 wherein the field directed along said hard axis is substantially uniform throughout said film.

4. A combination in accordance with claim 2 wherein said means for providing said field directed along said hard axis is segmented to provide said fields along bands in said film, and means for controllably activating said segmented means.

5. A combination in accordance with claim 2 including means for moving said single wall domain in said film along said easy axis.

6. A combination comprising an anisotropic thin magnetic film having hard and easy axes, means for selectively defining at input positions in said film single wall domains having a boundary unconstrained by the boundary of the plane of said film and being free to move along either said hard or easy axis, and first means for selectively moving single wall domains from said input positions in channels along said hard axis.

7. A combination in accordance with claim 6 wherein said first means comprises means for providing a field directed along said hard axis in said film, means including a plurality of hairpin conductors oriented along said hard axis and defining said channels therein, and means for selectively providing bipolar pulses in said hairpin conductors thus defining pulsed bipolar easy direction fields along said channels.

8. A combination in accordance with claim 7 including means for selectively moving said domains in parallel from one channel to another.

9. A combination in accordance with claim 7 wherein said means for providing a field directed along said hard axis is segmented to provide said fields along bands of said film, and means for controllably activating said segmented means.

10. A combination in accordance with claim 9 also including means for selectively moving single wall domains in said film along said easy axis.

11. A combination in accordance with claim 10 wherein said means for moving single wall domains along said easy axis comprises first and second conductive means including first and second interleaved conductors coupled to said film in a manner to translate said domains along said easy axis when pulsed in a multiphase manner.

12. A combination in accordance with claim 10 wherein said means for moving single wall domains along said easy axis comprises first and second conductive means including first and second pluralities of conductors, said first and second pluralities of conductors being oriented generally along hard and easy axes, respectively, said second conductors having portions oriented along said hard axis, said portions being interleaved with said first conductors along different bands of said film thus forming channels therein for selectively moving single wall domains along said easy axis when pulsed in a multiphase manner.

13. A combination in accordance with claim 5 including sense means spaced apart from said input position along said hard axis for detecting the presence and absence of single wall domains there.

14. A combination in accordance with claim 7 including a plurality of sense means each spaced apart from corresponding said input positions along said hard axis for detecting the presence and absence of single wall domains there.

15. A combination comprising an anisotropic thin magnetic film having hard and easy axes, means for providing in said film a single wall domain having a boundary unconstrained by the boundary of the plane of said film and being free to move along either said hard or easy axis, and means for moving said domain selectively in first or second directions along said easy axis in the absence of uncontrolled expansion thereof along said hard axis.

16. An information processing arrangement comprising a propagation medium, means for providing a nonvolatile discontinuity in said medium, said nonvolatile discontinuity having a boundary unconstrained by the boundary of a plane of movement in said medium and being free to move along either of first and second axes orthogonal to one another in said plane, and means for moving said discontinuity selectively along said first or second axis in the absence of uncontrolled expansion thereof along the nonselected axis.

17. An information processing arrangement comprising a magnetic medium having a first magnetization, means for establishing in said medium a region of second magnetization having a boundary unconstrained by the boundary of a plane of movement in said medium and being free to move in said plane along either of first and second axes orthogonal to one another, and means for selectively moving said region along said first or second axis in the absence of uncontrolled expansion thereof along the nonselected axis.

18. An information processing arrangement comprising an anisotropic magnetic film, means for defining along a first direction in said film propagation channels for single wall domains having boundaries unconstrained by the boundary of the plane of said film and being free to move in said plane along said first or along a second direction orthogonal to said first direction, means responsive to input signals for selectively providing single wall domains in input positions in said channels, and means for moving single wall domains along said first and second directions selectively in the absence of uncontrolled expansion along the nonselected direction, said last-mentioned means comprising means for selectively moving said domains along said channels to output positions there, and means for selectively moving said domains from channel to channel in said film.

References Cited

Publication I: Journal of Applied Physics, vol. 37, No. 7, June 1966, pp. 2584–2593 (Controlled Domain Tip Propagation, Part II, by Spain and Jauvtis).

JAMES W. MOFFITT, *Primary Examiner.*